United States Patent
Gavril et al.

Patent Number: 5,095,631
Date of Patent: Mar. 17, 1992

[54] MAGNETIC COMPASS

[76] Inventors: Solomon Gavril, P.O. Box 900, Kiryat Yam, Israel, 29000; Eitan Zeiler, 1 Bracha Havas St., Haifa, Israel, 33393; Avigdor Mor, P.O. Box 5156, Kiryat Bialik, Israel, 27151; Yshay Netzer, 112 Yuvalim, Yuvalim, Israel, 20142

[21] Appl. No.: 609,617

[22] Filed: Nov. 6, 1990

[30] Foreign Application Priority Data

Nov. 7, 1989 [IL] Israel .......... 92239

[51] Int. Cl.$^5$ .......... G01C 17/38
[52] U.S. Cl. .......... 33/361; 33/356; 33/333; 33/370; 73/1 E
[58] Field of Search .......... 33/361, 356, 357, 362, 33/333, 340, 365, 370; 73/1 E

[56] References Cited

U.S. PATENT DOCUMENTS

| | | | |
|---|---|---|---|
| 3,696,518 | 10/1972 | Leat | 33/357 |
| 3,744,312 | 7/1973 | Anderson | 33/356 |
| 4,327,498 | 5/1982 | Setter et al. | 33/361 |
| 4,539,760 | 9/1985 | Marchent et al. | 33/361 |
| 4,686,772 | 8/1987 | Sobel | 33/361 |
| 4,843,865 | 7/1989 | Fowler | 73/1 E |

*Primary Examiner*—William A. Cuchlinski, Jr.
*Assistant Examiner*—C. W. Fulton
*Attorney, Agent, or Firm*—Fleit, Jacobson, Cohn, Price, Holman & Stern

[57] ABSTRACT

An electronic compass system for determining the heading of an armored vehicle containing a large mass of ferromagnetic material, which system comprises a plurality of sensors, and for real-time computation of the corrections required of actual magnetometer measurements. Part of the values used for the computation are computed in advance, and part in real-time. Some of the computations are based on the perturbation of the earth magnetic field based on an algorithm which takes into account one or two rotational prolate ferromagnetic ellipsoids which have certain dimensions and which are at a predetermined distance from each other either represent the body of an armored vehicle, or when two ellipsoids are used, they represent the hull and turret of a tank.

12 Claims, 5 Drawing Sheets

MAGNETIC COMPASS

FIELD OF THE INVENTION

The invention relates to a magnetic compass system for use on objects which contain a large mass of ferromagnetic material. The system is of special use with armored vehicles and more particularly with very heavily armored vehicles such as battle tanks.

The system comprises the required sensors for all the necessary measurements and there are provided computation means for the instantaneous correction of actual measurements by the magnetometer, based on predetermined correction values computed and stored in a memory which cover the entire range of possible measurements.

The computations are based on a model of rotational bodies made of a suitable ferromagnetic material, at a predetermined distance from each other, and rotatable about a common vertical axis, which represent the hull and the turret of a tank. There is provided an algorithm for such computations based on a rather restricted number of parameters, allowing rapid real time measurements and also calibrations and memory storage for corrective data.

The positioning of the magnetometer, of significantly reduced overall dimensions, at a certain distance above the upper surface of the turret reduces magnetic disturbances and facilitates measurements.

BACKGROUND OF THE INVENTION

Many attempts have been made to obtain accurate direction measurements by means of a magnetic compass so as to largely eliminate disturbances due to the fact that such compass is located on a large ferromagnetic body such as an armored vehicle or on a battletank. Every ferro-magnetic body has a certain permanent magnetization acquired during its manufacture, and, for example with tanks, this differs from one tank to the other even in the same production series.

Furthermore, due to the magnetic field of the earth a temporary magnetization is induced in such ferromagnetic bodies, depending on the position respective the earth magnetic field vectors and the characteristic parameters of the vehicles (to be illustrated with respect to a tank), including the magnetic properties as well as the geometry of the tank including dimensions, permeability, mass and shape as well as angle respective the horizontal plane.

The resulting secondary magnetic field in the vicinity of the tank adds vectorially to the magnetic field of the earth and thus a compass attempting to measure the magnetic horizontal vectors will provide erroneous results.

Attempts to attain suitable corrections of such measurements by polynomial approximations have been made before.

In most existing systems the magnetic flux gates have been installed at close proximity to the main ferromagnetic body, and in specific cases close to the tank turret. Mathetmatic approximations by means of computations based on Fourier series have been attempted, but these were based on a very large number of parameters, requiring large and expensive computation means and complicated computations for a large number of corrective positions. It seems that this computation system is too complicated for larger angles of turret versus hull, including the inclination of the tank versus the horizontal plane.

In order to attain an accuracy suitable for land navigation or target acquisition, an electronic compass should be able to evaluate the perturbations introduced by the ferromagnetic body either through a sufficiently reliable empirical calibration method or through physical modelisation of the perturbation generating body, substract the perturbation from the overall measured horizontal field components, and thus arrive to the corrected azimuth. Electronic compasses that use empiricalmathematical calibration methods for the correction of the measured field components are described in U.S. Pat. Nos. 3,596,069; 3,696,518; 4,414,753; 4,686,772; British Patent No. 591019 and Israeli Patent No. 64237; the present invention, as it will be described below, makes use of the basic property of magnetic fields produced by finite bodies, namely, field decay with increasing distance and evaluates analytically the perturbation by replacing the actual shape of the ferromagnetic bodies with suitable dimensioned closed geometrical structures; moreover, an optimization method is used to find the best position for the magnetic sensors, thus minimizing the perturbation. The analytical modelization is applicable to attain a satisfactory degree of accuracy, owing to the fact that in the configuration of the present invention, the magnetic field sensors are removed from the ferrous body as much as mechanical and other technical constraints permit.

In Israeli patent No. 78889 residual magnetization of the armored vehicle is represented by a correction vector of the magnetization, and this is computed on the basis of Fourier series. This computation is based on the angle between the main body of the tank and its turret. The correction is based only on the relative angle of the turret versus the main body and magnetic measurements. It seems that the said patent requires calibration based on 3264 parameters, for 16 positions only of the turret/main body.

The close proximity of the magnetic sensor respective the main iron body causes serious problems which are overcome by the configuration of the measurement system of the present invention.

The present invention relates to an electronic magnetic compass system for determining the magnetic heading (azimuth) of a body made of ferro-magnetic material, such as an armored vehicle, and especially a tank. According to the present invention the main parameters of the measured system, such as position of turret versus main body of the tank, the inclination of the tank versus the horizon etc. are taken into consideration, resulting in a comparatively high accuracy of the measurement.

The electronic compass system of the present invention comprises the following main components:

a biaxial fluxgate magnetometer located on an antenna-like structure at a predetermined position and at a certain distance above the upper surface of the turret;

two inclinometer sensor means for the determination of the angle of the armored vehicle respective the horizontal plane;

means for measuring the angle between the hull and the turret of a tank;

suitable interface means with microprocessor for azimuth computation; a memory device storing an azimuth correction algorithm, based on the modelization of the two main components, hull and turret by means of two ellipsoids, each tank or armored vehicle being calibrated and the measured parameters being stored for future computations, display means being provided at desired locations.

The location of the fluxgate magnetometer at a distance of about 1.5 meters above the turret greatly reduces disturbances by the magnetic fields of the ferromagnetic bodies. The presence of a large ferromagnetic body in the magnetic field of the earth causes serious deviations in the measured magnetic field, and these are corrected by the system of the invention, in combination with the algorithm used for the computation.

Generally an accuracy of ±3° or better can be attained, which is adequate for most requirements.

According to the present invention, a limited number of parameters is required for the computations. For most uses the use of about 8 to 14 parameters was found to be adequate.

It is a further feature of the present invention that there is used a miniaturized biaxial fluxgate magnetometer, which can be positioned in an antenna-like structure above the turret.

The corrective system of the present invention is based on two ellipsoids of different size and shape, one representing the hull of the tank and the other its turret, such ellipsoids, of elongated shape, and made of a ferromagnetic material of suitable permeability, and which are rotatable versus each other (representing the rotation of the hull/turret system), in combination with a suitable determination of the inclination of the tank versus the horizon, and taking this into consideration in the computations, allows a rather simple and speedy determination of the required correction factor, providing a direct readout of the heading of the axis of the turret or of the hull axis if desired.

The computation is based on the assumption that the ellipsoids undergo magnetization and disturb the measured magnetic field. The model determines with adequate accuracy and by means of comparatively simple computations the disturbances resulting along each of the three axes of the ellipsoids and thus also compensates for any angular inclination of the tank. It is based with armored vehicles on 8 parameters only, and with heavy battle-tanks on the use of only 14 parameters. Each individual tank must be calibrated separately, and the results are stored in suitable memory means. It is generally adequate to use a 16 bit microcomputer with a memory of the order of 10K bytes.

According to the present invention a miniaturized biaxial flux-gate magnetometer is used which is positioned well above the upper surface of the turret, and preferably at a distance of about 1.5 meters above such surface. This distance greatly reduces magnetic disturbance due to the heavy ferromagnetic body and facilitates corrections of adequate accuracy.

The system of the invention comprises two inclometer sensors for determining the angle of the two main axes of the tank versus the horizontal and means for measuring the angles between the axes of the hull and the turret of the tank, in conjunction with signal processing and evaluation means, based on calibrating data stored in memory means of the system, and display means for indicating the corrected angle of heading of the tank.

The computations are based on correction algorithms and computations are made for both a certain type of vehicle (such as a certain tank model) and also for each individual vehicle.

The optimum location of the magnetometer and of field sensors is calculated and this determines their location on the armored vehicle.

BRIEF DESCRIPTION OF THE DRAWINGS

The invention is described by way of illustration only with reference to the enclosed Figures.

It is clear that variations and modifications can be resorted to without departing from the spirit of the invention.

MATHEMATICAL ANALYSIS

Figure 1:
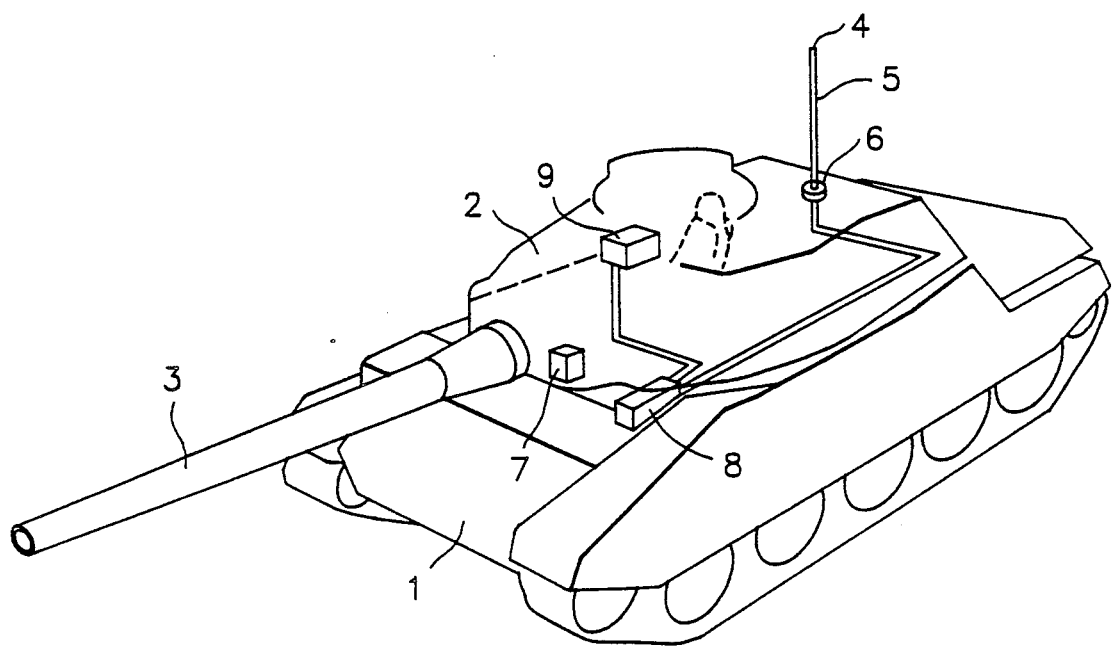
FIG. 1 illustrates an MBT equipped with an electronic magnetic compass system in conformity with the present invention.

The following mathematical analysis is used in the computations and is needed for the understanding of the operation mode of the electronic magnetic compass as described in the drawings, and of the corrective process.

As mentioned earlier, an electronic magnetic compass' working in a horizontal plane on a vehicle "made of wood" measures two field components along perpendicular axes (main axis and quadrature axis of the vehicle) and evaluates the azimuth according to:

$$Az = \arctan(-H_y/H_x) \quad (1)$$

The situation is more complicated when the compass works in an inclined plane; in that case, the knowledge of the vertical magnetic field component of the Earth is also needed, in addition to two inclination angles defining the position of the biaxial magnetometer with respect to the horizontal plane. While the two field components measured by the magnetometer are azimuth and inclination dependent, the vertical field component of the Earth is solely dependent on the geographic coordinates of the measurement point and thus it can be found from local geomagnetic maps or evaluated to a good degree of accuracy (providing no local magnetic annomalies exist) from the following:

$$Z = \frac{2M_o}{a^3} \cos\theta = Z_o\cos\theta \tag{2}$$

where:

$$Z_o/2 = 0.309 \tag{3}$$

$$\cos\theta = \cos\theta_g \cos\theta_o + \sin\theta_g \sin\theta_\bullet \cos(\lambda_g - \lambda_o) \tag{4}$$

with:

- $\theta_\bullet = 11.44°$—geographic colatitude of magnetic north;
- $\lambda_\bullet = 290.24°$—geographic longitude of magnetic north;
- $\theta_g =$—geographic colatitude of the measurement point;
- $\lambda_g =$—geographic longitude of the measurement point.

Figure 6:
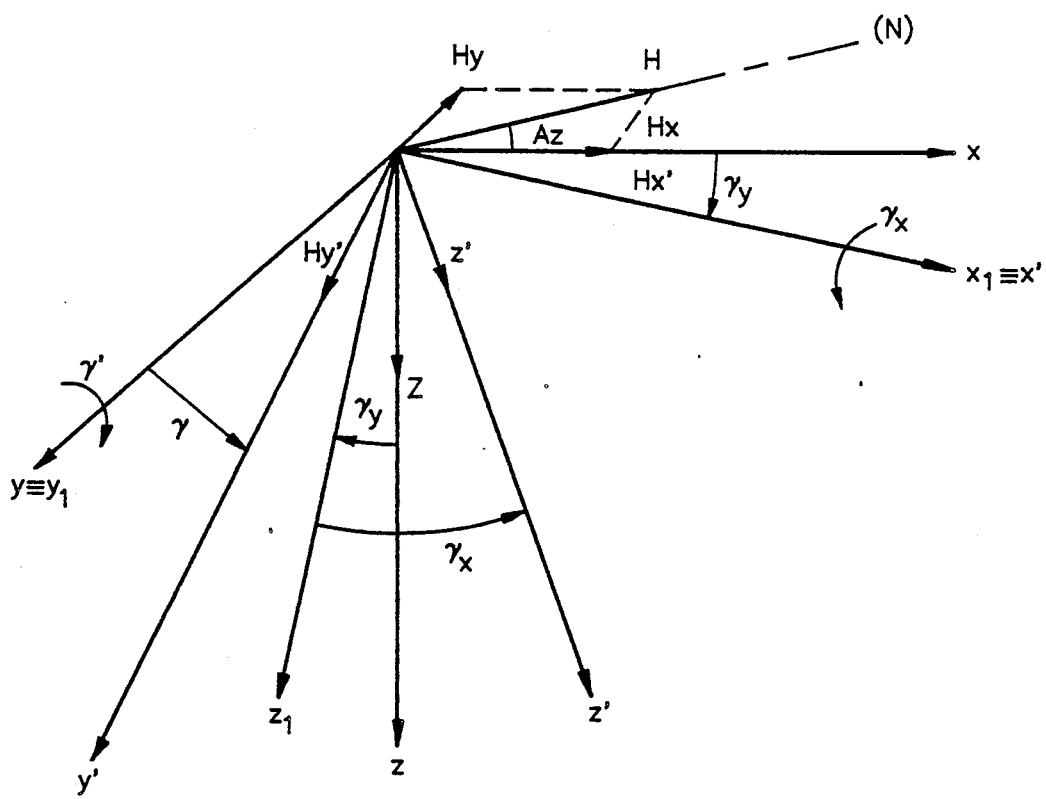
FIG. 6 gives the relation between field components measured along two perpendicular axes in an inclined plane and the corresponding components as they would be obtained if their measurement was performed in the horizontal plane.

An inclined triaxial magnetometer, measuring along the axes x',y',z' respectively, yields the field components $H_x'$, $H_y'$, and $Z'$. These are linked to the components $H_x$, $H_y$ and $Z$ which would of been measured in the horizontal plane through (for the same heading):

$$H_x = H\cos(Az) = H'_x \cos\gamma_y - H'_y \sin\gamma_x \sin\gamma_y - Z' \cos\gamma_x \sin\gamma_y$$

$$H_y = -H\sin(Az) = H'_y \cos\gamma_x - Z'\sin\gamma_x \tag{5}$$

$$Z = H'_x \sin\gamma_y + H'_y \sin\gamma_x \cos\gamma_y + Z' \cos\gamma_x \cos\gamma_y$$

where $\gamma_x$ and $\gamma_y$ are defined in FIG. 6.

Since Z is known for every point of measurement $H_x$ and $H_y$, together with $\gamma_x$ and $\gamma_y$ are sufficient for azimuth determination.

$$H_x = \frac{H'_x \cos\gamma_x - Z\cos\gamma_x \sin\gamma_y}{\cos\gamma_x \cos\gamma_y} \tag{6}$$

$$H_y = \frac{H'_x \sin\gamma_x \sin\gamma_y + H'_y \cos\gamma_y - Z\sin\gamma_x}{\cos\gamma_x \cos\gamma_y} \tag{7}$$

Figure 7:
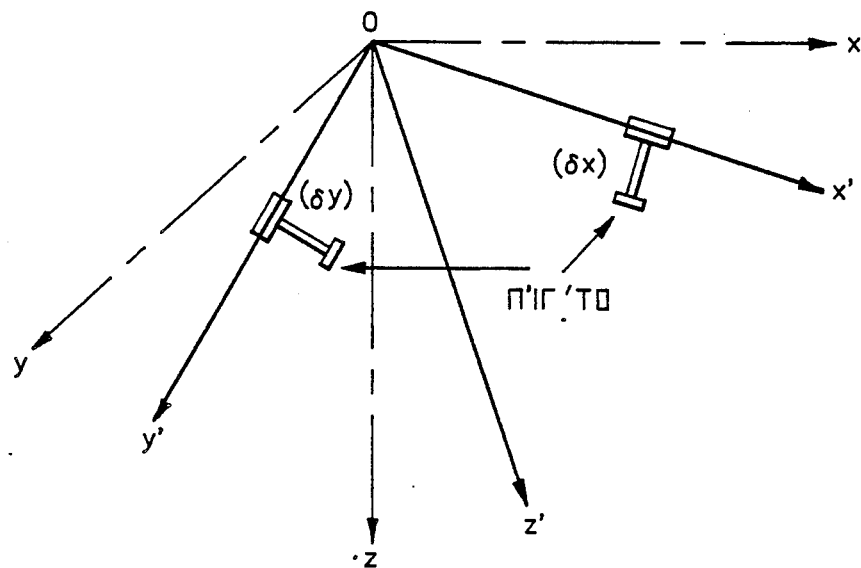
FIG. 7 shows the relation between inclination angles as they are obtained by way of pendulum type inclinometers, and inclination angles defining the position of the plane in which field components are measured with respect to the horizontal plane.

The angles $\gamma_x$ and $\gamma_y$ needed for the geometric correction of measured field components are derived from the values of the angles and as outputted by two appropriately placed pendular type inclinometers (see FIG. 7):

$$\gamma_x = \delta_x \tag{8}$$

$$\tan\gamma_y = \tan\delta_y \cos\delta_x \tag{9}$$

Figure 3:
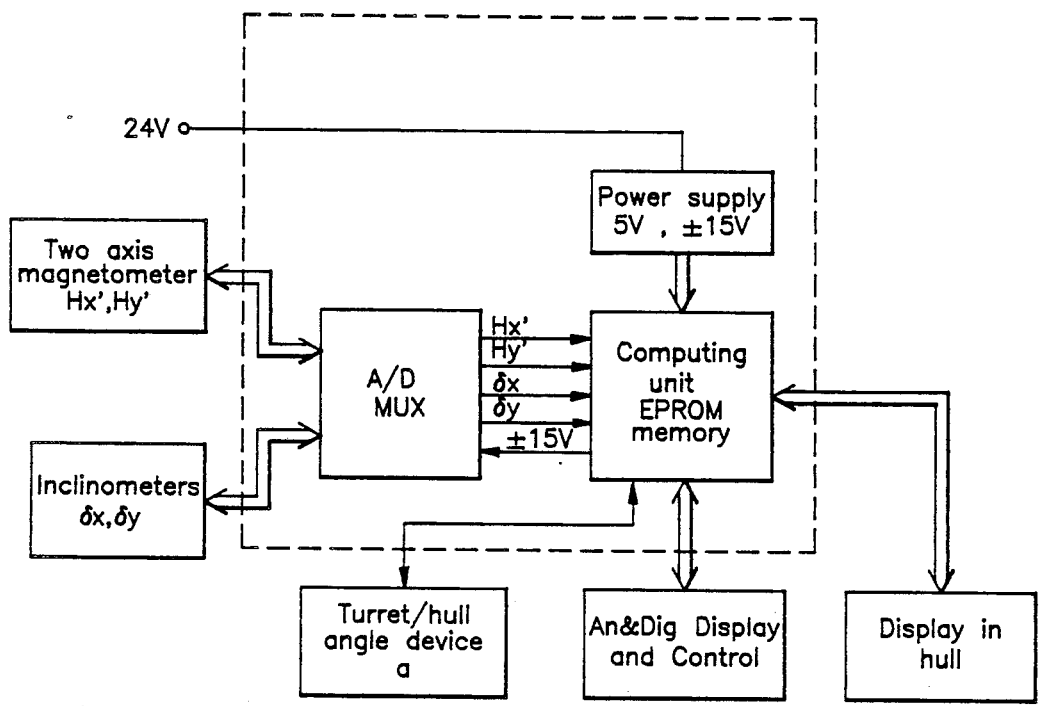
FIG. 3 is a schematic flow chart describing the azimuth correction process.
Figure 4:
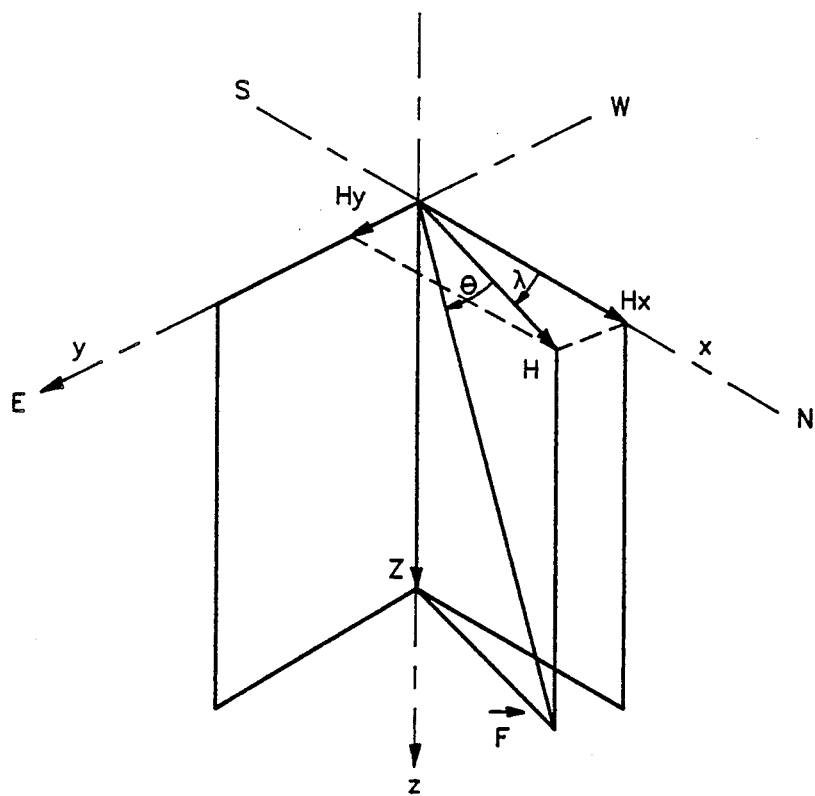
FIG. 4 describes the components of the Earth field with respect to a coordinate frame linked to the Earth.
Figure 5:
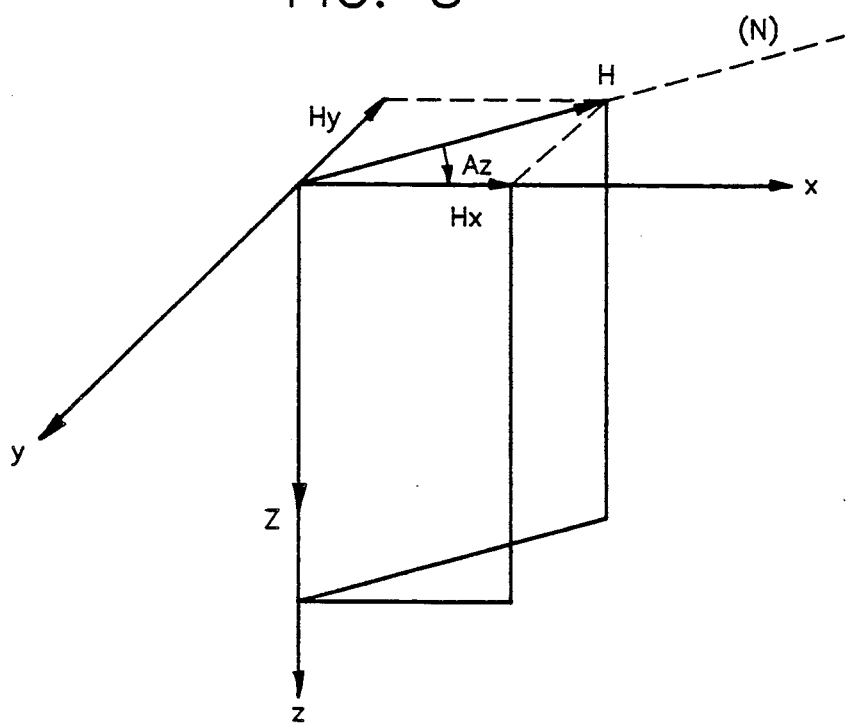
FIG. 5 shows the azimuth computation process from field measurements along two horizontal axes linked to the vehicle (main axis and quadrature axis).

In the case of an electronic magnetic compass placed on a ferromagnetic vehicle, the values of $H_x$ and $H_y$ as obtained above still contain the perturbation of the iron body of the vehicle; the correction process as illustrated by the flow chart in FIG. 3 has to take this fact into account.

For the purpose of iron body perturbation computation, the turret and hull are modeled by two appropriately dimensioned prolate rotational ellipsoids of main axes $a_t$, $b_t$ and $a_h$, $b_h$ respectively, made up of a fictitious iron of magnetic relative permeability $m_r$.

The unperturbed Earth magnetic field F:

$$\hat{F} = H_{xo}\hat{1}_x + H_{yo}\hat{1}_y + H_{zo}\hat{1}_z \tag{10}$$

is altered by each ellipsoid by a perturbation field:

$$\delta\hat{F}_i = \delta H_{xi}\hat{1}_x + \delta H_{yi}\hat{1}_y + \delta H_{zi}\hat{1}_z \tag{11}$$

where i stands for t or h respectively.

$$\delta H_{xi} = H_{xxi} + H_{xyi} + H_{xzi}$$

$$\delta H_{yi} = H_{yxi} + H_{yyi} + H_{yzi} \tag{12}$$

$$\delta H_{zi} = H_{zxi} + H_{zyi} + H_{zzi}$$

(in the following, the index i will be ommited from the expressions, although it is implicitly assumed where applicable).

$$H_{xx} = \frac{3TH_x}{g_e + \frac{1}{\mu_r - 1}} \cdot \frac{1}{4\pi\rho_o^3} \left( \frac{1}{2} \ln \frac{u + \rho_o}{u - \rho_o} - \frac{u\rho_o}{u^2 - v^2} \right) \tag{13}$$

$$H_{yx} = \frac{3TH_x}{g_e + \frac{1}{\mu_r - 1}} \cdot \frac{1}{4\pi\rho_o^3} \cdot \frac{\sqrt{\rho_o^2 - v^2}}{\sqrt{u^2 - \rho_o^2}} \cdot \frac{v\rho_o}{u^2 - v^2} \cos\psi \tag{14}$$

$$H_{zx} = \frac{3TH_x}{g_e + \frac{1}{\mu_r - 1}} \cdot \frac{1}{4\pi\rho_o^3} \cdot \frac{\sqrt{\rho_o^2 - v^2}}{\sqrt{u^2 - \rho_o^2}} \cdot \frac{v\rho_o}{u^2 - v^2} \sin\psi \tag{15}$$

$$H_{xy} = \frac{3TH_y}{g_q + \frac{1}{\mu_r - 1}} \cdot \frac{1}{4\pi\rho_o^3} \cdot \frac{\sqrt{\rho_o^2 - v^2}}{\sqrt{u^2 - \rho_o^2}} \cdot \frac{v\rho_o}{u^2 - v^2} \cos\psi \tag{16}$$

$$H_{yy} = \frac{3TH_y}{g_q + \frac{1}{\mu_r - 1}} \cdot \frac{1}{4\pi\rho_o^3} \left[ \frac{1}{2}\left( \frac{1}{2}\ln\frac{u+\rho_o}{u-\rho_o} - \frac{u\rho_o}{u^2-v^2} \right) + \frac{u\rho_o}{u^2-v^2} \cdot \frac{\rho_o^2 - v^2}{u^2 - \rho_o^2}\cos^2\psi \right] \tag{17}$$

-continued $$H_{zy} = \frac{3TH_y}{g_q + \frac{1}{\mu_r - 1}} \frac{1}{4\pi\rho_o^3} \frac{\rho_o^2 - v^2}{u^2 - \rho_o^2} \frac{u\rho_o}{u^2 - v^2} \sin\psi\cos\psi \quad (18)$$

$$H_{xz} = \frac{3TZ}{g_q + \frac{1}{\mu_r - 1}} \frac{1}{4\pi\rho_o^3} \frac{\sqrt{\rho_o^2 - v^2}}{\sqrt{u^2 - \rho_o^2}} \frac{v\rho_o}{u^2 - v^2} \sin\psi \quad (19)$$

$$H_{yz} = \frac{3TZ}{g_q + \frac{1}{\mu_r - 1}} \frac{1}{4\pi\rho_o^3} \frac{\rho_o^2 - v^2}{u^2 - \rho_o^2} \frac{u\rho_o}{u^2 - v^2} \sin\psi\cos\psi \quad (20)$$

$$H_{zz} = \frac{3TZ}{g_q + \frac{1}{\mu_r - 1}} \frac{1}{4\pi\rho_o^3} \left[ \frac{1}{2}\left(\frac{1}{2}\ln\frac{u + \rho_o}{u - \rho_o} - \frac{u\rho_o}{u^2 - v^2}\right) + \frac{u\rho_o}{u^2 - v^2} \frac{\rho_o^2 - v^2}{u^2 - \rho_o^2} \sin^2\psi \right] \quad (21)$$

$$T = \frac{4}{3}\pi ab^2; \quad \rho_o = \sqrt{a^2 - b^2} \quad (22)$$

$$g_e = \frac{ab^2}{\rho_o^3}\left(\frac{1}{2}\ln(a + \rho_o)/(a - \rho_o) - \rho_o/a\right) \quad (23)$$

$$g_q = \frac{1}{2} \cdot \frac{ab^2}{\rho_o^3}\left(-\frac{1}{2}\ln(a + \rho_o)/(a - \rho_o) - \rho_o a/b^2\right) \quad (24)$$

$$\psi = \arctan\frac{z}{y} \quad (25)$$

$$u = \frac{1}{2}[(x^2 + y^2 + z^2 + \rho_o^2) + \sqrt{(x^2 + y^2 + z^2 + \rho_o^2)^2 - 4x^2\rho_o^2}]^{\frac{1}{2}} \quad (26)$$

$$v = x\rho_o/u \quad (27)$$

The computed values of $\delta H_{xi}$ and $\delta H_{yi}$ are evaluated through an iterative process as shown in FIG. 3 and subsequently substracted from the measured entities, yielding the corrected azimuth angle. The iteration process is since the Earth field components (primary field) used for the evaluation of the perturbation introduced by the iron bodies, are obtained only approximately from the measurement.

The parameters $a_i$, $b_i$, x, y, z, $d_1$, $d_2$ and $d_3$ are computed through an optimization technique from calibration data gathered during the initial setup of the electronic magnetic compass on a particular vehicle.

DESCRIPTION OF THE PREFERRED EMBODIMENT

The following description, relating to a specific type of tank is illustrative only and ought to be construed in a non-limitative manner.

The invention is herein described with respect to a tank as illustrated in FIG. 1, having a hull 1, turret 2, and a cannon 3. A biaxial magnetometer 4 is mounted on an antenna-like rod 5 at an optimal location on the turret 2 and outputs the analog signals $H_x'$, $H_y'$ proportional to the components of the magnetic field along the magnetometer axes.

The magnetic compass system further includes two perpendicularly mounted pendulum type inclinometers 6, located in the base housing of the rod 5.

The inclinometers 6 measure the deviation of the tank from the horizontal plane about the longitudinal axis ($\delta_x$) and the quadrature axis ($\delta_y$).

The magnetic compass system further includes an angle measuring device 7 for determining the angle of rotation $\alpha$ of the turret 2 with respect to the hull 1 (e.g. a shaft encoder).

As shown in the block diagram of FIG. 3, the magnetic compass system further includes an analog to digital and multiplexer card for the translation of the analog signals into digital signals readable by the computer unit.

Figure 2:
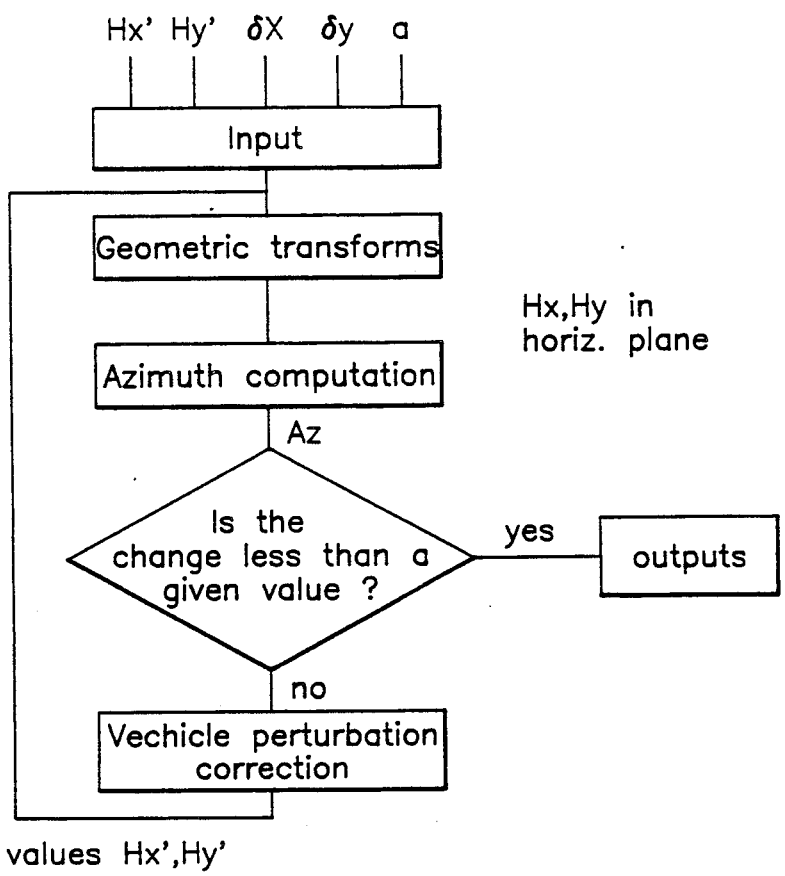
FIG. 2 describes the main parts of the electronic magnetic compass in the form of a block diagram.

The inputted data are processed by the computing unit in accordance with the correction algorithm as described in the flow chart of FIG. 2. The correction algorithm and the value of the Z component of the local magnetic field are stored in an EPROM non-volatile memory as shown in FIG. 3.

Figure 8:
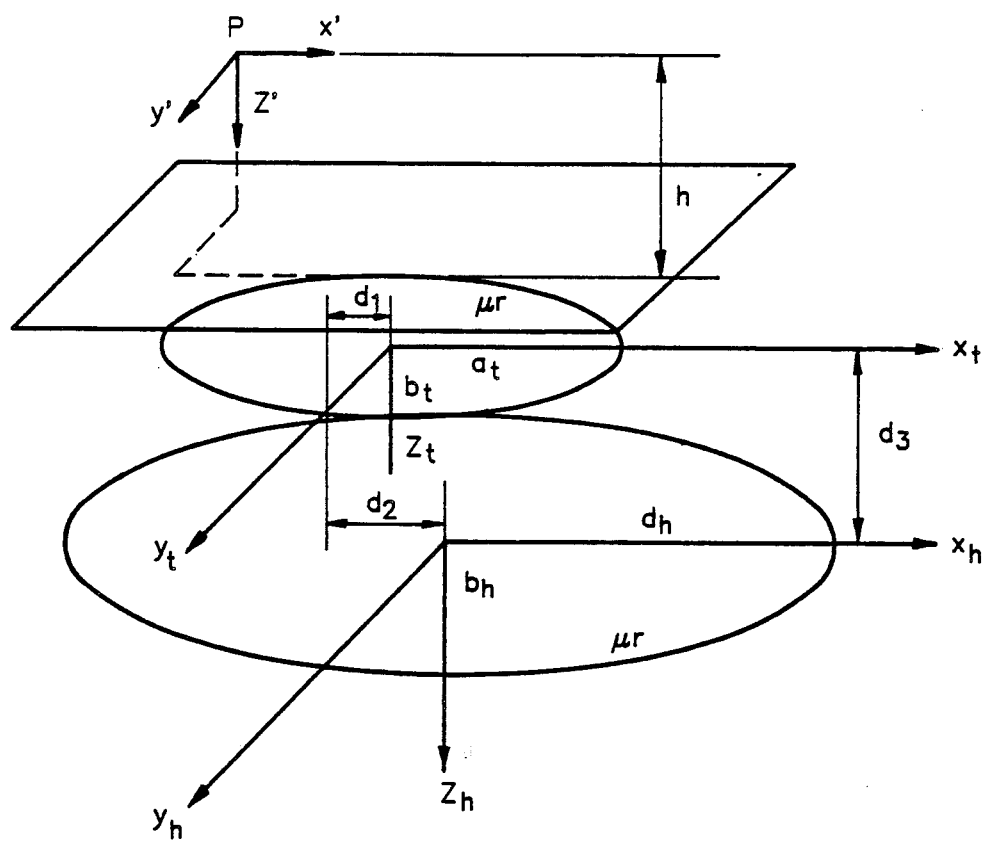
FIG. 8 represents the modelization (side view) of the vehicle by two prolate rotational ellipsoids of main axes $(a_h, b_h)$ and $(a_t, b_t)$ respectively made of fictitious ferromagnetic material of relative permeability $m_r$ the upper ellipsoid, representing the turret, rotates around a "vertical" axis at a distance $d_1$ from its center of symmetry; the FG magnetometers are fixed on the upper ellipsoid at point P.
Figure 9:
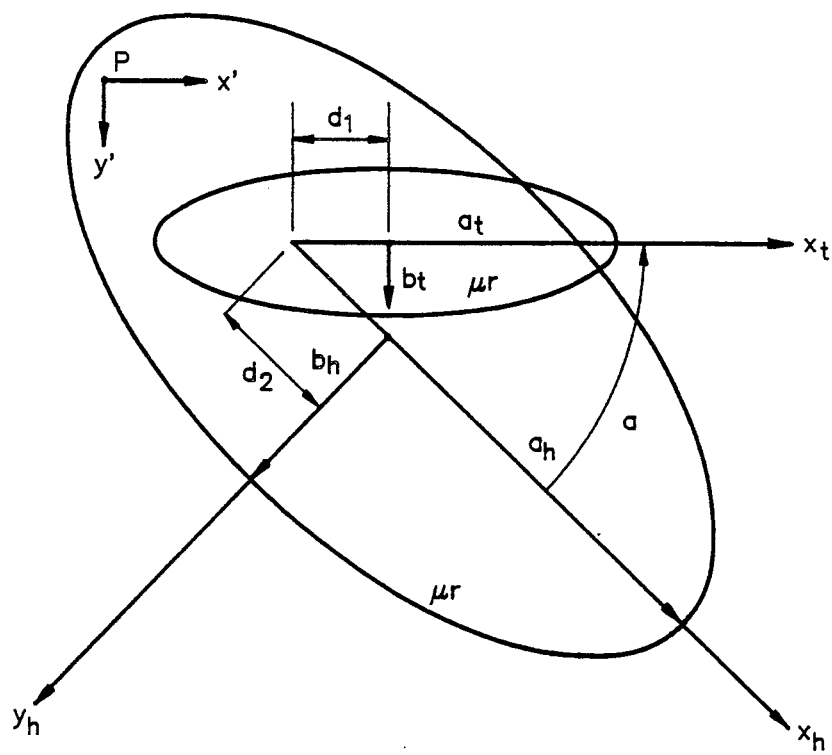
FIG. 9 same as FIG. 8, but top view.
Figure 10:
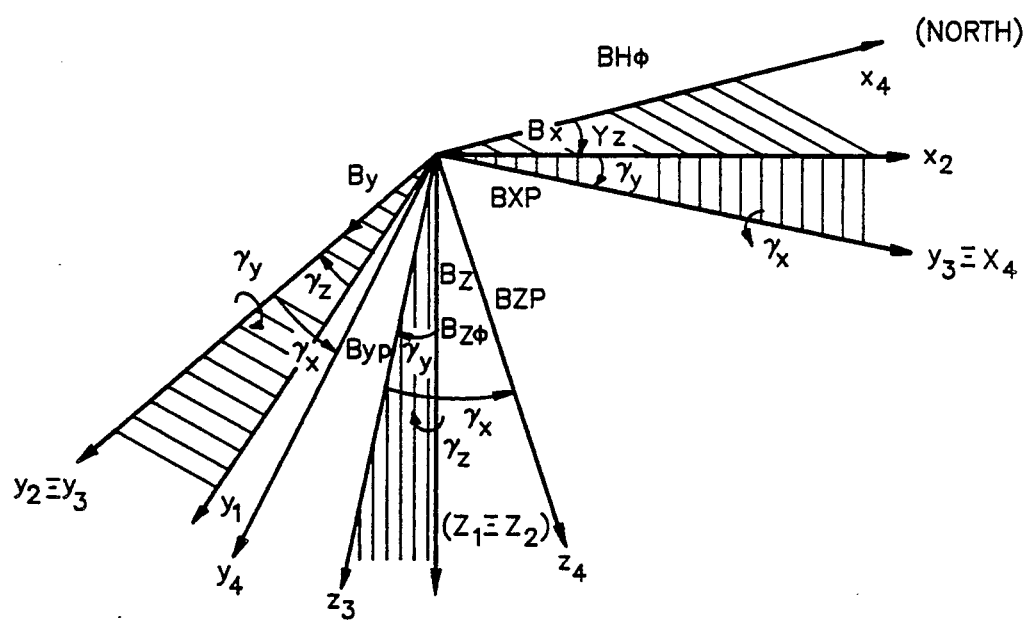
FIG. 10 describes the magnetic field components in the frame of reference used in various stages of azimuth correction process.

In accordance with the correction algorithm, as shown in FIG. 2, in the first stage, the measured inclination angles $\delta_x$ and $\delta_y$ are used to determine the angles $_x$ and $_y$ (Eqs. 8 and 9 respectively) needed for the reduction of the measured field components $H_x'$ and $H_y'$ to the horizontal plane, in conformity with Eqs. 6 and 7 respectively. These values of the field components $H_x$ and $H_y$ give an approximate azimuth and allow for the determination of the perturbations introduced in the local magnetic field by the hull 1 and the turret 2, represented in the present embodiment by two prolate rotational ellipsoids, as shown in FIGS. 8 and 9. These corrections are computed according to Eqs. (13)–(21). The parameters $a_i$, $b_i$, $x_i$, $y_i$, $z_i$, $d_1$, $d_2$, $d_3$ used in Eqs. (13)–(21) are determined beforehand for the specific tank type during the initial setup and calibration of the system.

The computed perturbation values $\delta H_{xh}$, $\delta H_{xt}$ and $\delta H_{yh}$, $\delta H_{yt}$ are then substracted from the initial values $H_x$ and $H_y$ respectively and a new azimuth value is computed. The correction process is repeated iteratively untill the criterion of satisfactory convergence is attained; upon the obtaining of the predetermined accuracy, the results are displayed both digitally and analogically on the hull display panel 8 and on the turret display pannel 9 for use by the driver and commander/-gunner respectively The system described herein, when installed on an M60A3 type MBT, with the rod supporting the sensors placed on a standard communication antenna mount on the turret 2, led to azimuth determinations with an RMS error value less than 3°.

We claim:

1. An electronic magnetic compass system for determining the heading of a portion of a heavily armored vehicle, comprising in combination: a biaxial fluxgate magnetometer positioned in an antenna-like structure in a position above a highest level of the vehicle for determining magnetic field components with respect to the vehicle; two inclinometers for determining pitch and tilt angles of the vehicle with respect to a horizontal plane; computing means for geometric correction of the magnetic field components dependent on the pitch and tilt angles, for determining iron body perturbation of the local magnetic field of the earth due to one or more rotational prolate ferromagnetic ellipsoids of predetermined dimensions and position relative to each other, representing iron body portions of said vehicle, for perturbation correction of the magnetic field components, and for determining the heading of a portion of the vehicle dependent on the geometric and perturbation corrections.

2. A system according to claim 1, further comprising external computer means attached to a magnetic compass for determining a position for installing the magnetometer for a specific class of armored vehicles and for each individual member of such class.

3. A system according to claim 1, in which
the magnetometer and inclinometers continually generate measurement signals in real time and
computing means continually determines corrected heading in real time and include:
means for determining the components of the magnetic field in the horizontal plane dependent on pitch and tilt angles and on magnetic field components measured along the axes of the fluxgate magnetometer,
means for determining iron-body perturbation values,
means for subtracting the perturbation values from the magnetic field components in the horizontal plane,
means for determining the corrected azimuth and
means for displaying the results which indicate the heading of the vehicle.

4. A system according to claim 1, in which computing means include means for determining the iron body perturbation of the local magnetic field of the earth depending on a limited number of parameters depending on the class of the vehicle.

5. A system according to claim 1, in which computing means include means for:
projecting measured components of the magnetic field to the horizontal plane;
determining an approximate heading of the vehicle;
determining iron body perturbation;
correcting projected magnetic field components dependent on said perturbation;
determining a corrected azimuth based on the corrected components;
checking results for convergence based on the corrected azimuth to determine accuracy of results; and
continuing such correcting of components, determining of azimuth and checking of convergence depending upon the accuracy of results.

6. A system according to claim 1, further comprising external computing means for:
determining optimum magnetometer location depending on calibration files gathered during a setup stage of said compass system; and
determining dimensions and relative position of said ellipsoids upon which said determination of iron body perturbation depends.

7. A system according to claim 6, in which, in order to optimize correction of the magnetic field components, said external computing means include means for:
inputting, during a data acquisition stage in which a true magnetic heading is known, magnetic field inclination angle signals for a set of traverse angles of the portions of the vehicle with respect to each other;
determining optimum values for fixed magnetization of said ellipsoids;
determining optimum dimensions and position of said ellipsoids;
determining optimum magnetic permeability for said ellipsoids;
determining optimum positioning for the magnetometer; and
outputting result signals for said determinations.

8. A system for measurement with adequate accuracy the heading of a heavily armored vehicle by compass means, by correcting magnetic perturbations due to residual and temporary magnetization of the body of such vehicle, which system comprises:
a biaxial fluxgate magnetometer on the vehicle in a position selected to optimize correction of flux measurement signals generated by the magnetometer;
pendulum-type inclinometers for outputting electrical measurement signals corresponding to inclination angles of the vehicle with respect to horizontal plane;
an A/D+MUX card for receiving and processing such measurement signals;
a microprocessor based unit communicating with such card for real time signal corrections;
a non-volatile memory apparatus communicating with the microprocessor to direct microprocessor function based on models within the memory representing mathematical procedures;
control and display panels in the vehicle for displaying signals output from the microprocessor;
interconnecting cables between the above parts,
and in which the memory includes a model of one or more prolate ferromagnetic ellipsoids of predetermined size and position relative to each other representing respective portions of the vehicle to direct the microprocessor to correct signals input from the card to generate corrected signals output to the panels.

9. A system according to claim 1, in which computing means include, means for computing the values of $\delta H_x$ and $\delta H_y$ by an iterative process and for subtracting these from the measured values $H_x$ and $H_y$ of the magnetometer for providing a corrected azimuth angle.

10. A system of claim 1, in which:

the armored vehicle is a main battle tank including a hull and a rotatable turret bearing a gun;
the perturbation due to two independently rotatable ferromagnetic ellipsoids representing the hull and turret of the tank is determined; and
the system further comprises:
means for measuring the angle between the hull and the turret.

11. The system of claim 8, in which:
the heavily armored vehicle is a main battle tank with a hull and a turret bearing a gun;
the memory includes a model of two ellipsoids representing the turret and hull respectively; and
the system further comprises:
an angle measuring device for determining the angle of rotation between the turret and hull.

12. The system of claim 1, in which computing means include apparatus representing the following equations for converting input signals $H_x$ and $H_y$ corresponding to measured magnetic field components in the horizontal plane into output signals $\delta H_x$ and $\delta H_y$, corresponding to unperturbed magnetic field components:

$$\delta H_x = H_{xx} + H_{xy} + H_{xz}$$
$$\delta H_y = H_{yx} + H_{yy} + H_{yz}$$

$$H_{xx} = \frac{3TH_x}{g_e + \frac{1}{\mu_r - 1}} \cdot \frac{1}{4\pi \rho_o^3} \left( \frac{1}{2} \ln \frac{u + \rho_o}{u - \rho_o} - \frac{u\rho_o}{u^2 - v^2} \right)$$

$$H_{yx} = \frac{3TH_x}{g_e + \frac{1}{\mu_r - 1}} \cdot \frac{1}{4\pi \rho_o^3} \cdot \frac{\sqrt{\rho_o^2 - v^2}}{\sqrt{u^2 - \rho_o^2}} \cdot \frac{v\rho_o}{u^2 - v^2} \cos\psi$$

$$H_{zy} = \frac{3TH_y}{g_q + \frac{1}{\mu_r - 1}} \cdot \frac{1}{4\pi \rho_o^3} \cdot \frac{\sqrt{\rho_o^2 - v^2}}{\sqrt{u^2 - \rho_o^2}} \cdot \frac{v\rho_o}{u^2 - v^2} \cos\psi$$

$$H_{yy} = \frac{3TH_y}{g_q + \frac{1}{\mu_r - 1}} \cdot \frac{1}{4\pi \rho_o^3} \left[ \frac{1}{2} \left( \frac{1}{2} \ln \frac{u + \rho_o}{u - \rho_o} - \frac{u\rho_o}{u^2 - v^2} \right) + \frac{u\rho_o}{u^2 - v^2} \cdot \frac{\rho_o^2 - v^2}{u^2 - \rho_o^2} \cos^2\psi \right]$$

$$H_{xz} = \frac{3TZ}{g_q + \frac{1}{\mu_r - 1}} \cdot \frac{1}{4\pi \rho_o^3} \cdot \frac{\sqrt{\rho_o^2 - v^2}}{\sqrt{u^2 - \rho_o^2}} \cdot \frac{v\rho_o}{u^2 - v^2} \sin\psi$$

$$H_{yz} = \frac{3TZ}{g_q + \frac{1}{\mu_r - 1}} \cdot \frac{1}{4\pi \rho_o^3} \cdot \frac{\rho_o^2 - v^2}{u^2 - \rho_o^2} \cdot \frac{u\rho_o}{u^2 - v^2} \sin\psi\cos\psi$$

$$T = \frac{4}{3}\pi ab^2; \quad \rho_o = \sqrt{a^2 - b^2}$$

$$g_e = \frac{ab^2}{\rho_o^3} \left( \frac{1}{2} \ln(a + \rho_o)/(a - \rho_o) - \rho_o/a \right)$$

$$g_q = \frac{1}{2} \cdot \frac{ab^2}{\rho_o^3} \left( -\frac{1}{2} \ln(a + \rho_o)/(a - \rho_o) - \rho_o a/b^2 \right)$$

$$\psi = \arctan \frac{z}{y}$$

$$u = \frac{1}{2} [(x^2 + y^2 + z^2 + \rho_o^2) + \sqrt{(x^2 + y^2 + z^2 + \rho_o^2)^2 - 4x^2\rho_o^2}]^{\frac{1}{2}}$$

$$v = x\rho_o/u$$

* * * * *